2,750,423

TRIOL OF LEVOPIMARIC ACID-QUINONE ADDUCT

George C. Harris, Wilmington, Del., assignor to Hercules Powder Company, Wilmington, Del., a corporation of Delaware No Drawing. Application April 25, 1955, Serial No. 503,775

2 Claims. (Cl. 260—617)

This invention relates to a new alcohol that may be prepared from levopimaric acid and, more specifically, to a triol obtainable by the reduction of the adduct of levopimaric acid and quinone.

It is well known that levopimaric acid and quinone will react to form a product melting at 190° C. which is believed to be an adduct having the formula

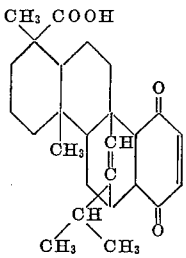

Details of the process and a description of the adduct are given by Ruzicka and Kaufmann, Helv. Chim. Acta 24, 1425–34 (1941).

In accordance with the present invention, it is found that the above-described levopimaric acid-quinone adduct can be reduced by means of an alkali metal aluminum hydride to produce a triol wherein the keto groups of the quinone nucleus have been reduced to hydroxyl groups, and the carboxyl group has been reduced to a hydroxy methyl group. This new alcohol is believed to have the following formula:

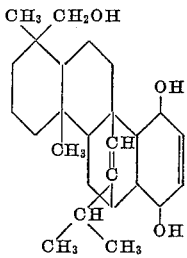

The following example further illustrates the preparation of the alcohol. Parts and percentages are by weight unless otherwise specified.

Example

The levopimaric acid-quinone adduct was prepared in known manner by allowing levopimaric acid and quinone to react at room temperature in methanol solution. Eight and two-tenths parts (0.02 mole) of the adduct was dissolved in 10 parts of tetrahydrofuran and admixed with a solution of 3 parts of lithium aluminum hydride in 300 parts of ether. The resulting suspension was stirred at room temperature for 72 hours. Thereafter, 13.5 parts of ethyl acetate was added dropwise to decompose excess reagent and sufficient water was next added to decompose the lithium aluminum complex. The reaction mixture was next extracted with 300 parts of ether and the resulting ether solution was evaporated to yield 8.4 parts of a crystalline material. This material was recrystallized from methanol to yield 2.0 parts of a crystalline product melting at 198–201° C. Analysis—calculated for $C_{26}H_{40}O_3$: C 78.00, H 10.00, Zere. OH 12.8; found: C 77.47, H 10.44, Zere. OH 13.1. Analysis thus indicates that the product has the triol structure given above.

The new triol of this invention can be prepared, as illustrated above, by the reduction with an alkali metal aluminum hydride of the adduct of levopimaric acid and quinone which is a crystalline material melting at 190° C.

The reduction of the adduct with the alkali metal aluminum hydride is generally carried out in solution. Any inert organic solvent may be used as the medium for the reaction, provided that it is a solvent for either one or both of the reactants. Suitable solvents that can be used are diethyl ether, di-n-butyl ether, dioxane, tetrahydrofuran, diethyl carbitol, benzene, hexane, toluene, etc. The reaction should be carried out under anhydrous conditions in order to avoid hydrolysis of the hydride and reduction in the yields thereby. Any alkali metal aluminum hydride, such as lithium, sodium, etc., aluminum hydrides may be used for the reduction of the adduct to the triol, but lithium aluminum hydride is preferred. The amount of alkali metal aluminum hydride is preferably within the ratio of from about 0.5 to about 10 moles per mole of adduct and, more preferably, is from about 1 to about 5 moles per mole of adduct. In general, the reaction is carried out at a temperature of from about 0° C. to 50° C. and preferably at a temperature of from about 15° C. to about 35° C.

The alkali metal aluminum complex which is formed as an intermediate in the reaction is hydrolyzed by the addition of water, an acid or a base. Suitable acids for this purpose are the mineral acids such as sulfuric acid, phosphoric acid, etc., but an alkali metal hydroxide such as sodium hydroxide, potassium hydroxide, etc., may be used with equivalent results. The concentration of the hydrolytic agent may be varied over a wide range since water alone can be used, but in general if an acid or base is used, the concentration will be within the range of from about 5% to about 25% by weight of the adduct. The hydrolysis readily takes place at room temperature, and elevated temperatures are not required but may be used.

The method by which the triol is separated from the reaction mixture will, of course, depend upon the type of solvent used for carrying out the reaction. If a water-immiscible solvent is used for the reduction reaction, in which solvent the triol is soluble, the triol will then be present in the organic phase and can be separated from that phase by removal of the solvent. It may also be separated from the reaction mixture by extraction with a suitable water-immiscible solvent such as, for example, ethyl benzene, toluene, hexane, etc. It is a crystalline solid and may be purified by crystallization procedures.

The new triol produced in accordance with this invention can be esterified by reacting it with an acyl anhydride or an acyl halide as, for example, acetic anhydride, propionic anhydride, phthalic anhydride, ketene, acetyl chloride, benzoyl chloride, etc. Thus, it is possible to produce any aliphatic, cycloaliphatic, aryl aliphatic or aromatic acid ester of this important new alcohol. The esterification reaction is generally carried out in an organic solvent that is a solvent for the triol. The temperature employed may be varied over a wide range and will depend upon the acylating agent used.

The new triol of this invention is a valuable intermediate for the preparation of synthetic materials. It is particularly important in the synthesis of monobasic acid esters, which esters can be used as plasticizers for film-forming materials, particularly for nitrocellulose.

In illustration of the above, 3.98 parts of the triol is heated, with stirring, with 3.48 parts of caproic acid at a temperature of 200° C. until evolution of water ceases. The resultant product is taken up in benzene and washed free of acidic material with 1% aqueous sodium hydroxide. Removal of the benzene by distillation leaves a brittle, amber, resinous ester. This ester is formulated into a nitrocellulose lacquer using 10 parts RS ¼ sec. nitrocellulose, 10 parts ester gum and 5 parts of the above ester in a solvent composed of 50 parts toluene, 35 parts butyl acetate and 15 parts n-butanol. When this lacquer is applied in the form of a film in the usual manner, the film is found to have improved resistance to discoloration by the action of light.

The triol of the invention can also be utilized in the preparation of polymeric esters which are prepared by reaction of the triol with polybasic acids and it may also be reacted with ethylene oxide to produce a valuable polymeric ether having surface-active properties.

What I claim and desire to protect by Letters Patent is:
1. A triol having the formula

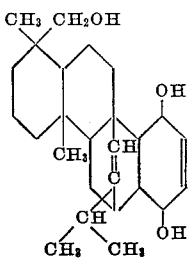

2. The process which comprises reducing the adduct of levopimaric acid and quinone with an alkali metal aluminum hydride, and recovering a compound of the formula:

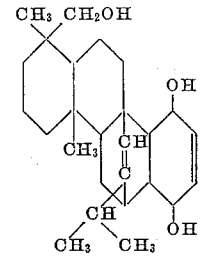

as a product of the reaction.

References Cited in the file of this patent

Ruzick et al.: Helv. Chim. Acta, vol. 24 (1941), pp. 1425–30 (6 pp.).

Brown: Organic Reactions, vol. 6 (1951), pp. 478, 504 (2 pp.).